US008831087B2

(12) United States Patent
Panchal et al.

(10) Patent No.: US 8,831,087 B2
(45) Date of Patent: Sep. 9, 2014

(54) EFFICIENT PREDICTION MODE SELECTION

(75) Inventors: Rahul Panchal, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 595 days.

(21) Appl. No.: 12/424,472

(22) Filed: Apr. 15, 2009

(65) Prior Publication Data

US 2010/0086027 A1 Apr. 8, 2010

Related U.S. Application Data

(60) Provisional application No. 61/103,100, filed on Oct. 6, 2008.

(51) Int. Cl.
| | |
|---|---|
| H04N 7/12 | (2006.01) |
| H04N 11/02 | (2006.01) |
| H04N 7/26 | (2006.01) |
| H04N 7/36 | (2006.01) |
| H04N 7/50 | (2006.01) |

(52) U.S. Cl.
CPC ... H04N 19/00024 (2013.01); H04N 19/00266 (2013.01); H04N 19/00175 (2013.01); H04N 19/00163 (2013.01); H04N 19/00715 (2013.01); H04N 19/00739 (2013.01); H04N 19/00721 (2013.01); H04N 19/00351 (2013.01); H04N 19/00036 (2013.01); H04N 19/00545 (2013.01); H04N 19/00781 (2013.01); H04N 19/00278 (2013.01)
USPC .................. 375/240; 375/240.02; 375/240.23

(58) Field of Classification Search
CPC .................. H04N 19/00024; H04N 19/00715; H04N 19/00739; H04N 19/00278; H04N 19/00781; H04N 19/00721
USPC ....................................... 375/240
See application file for complete search history.

(56) References Cited

U.S. PATENT DOCUMENTS

| 2004/0057523 A1 | 3/2004 | Koto et al. | |
|---|---|---|---|
| 2008/0089404 A1* | 4/2008 | Okazaki et al. | 375/240 |

FOREIGN PATENT DOCUMENTS

| JP | 2008005145 A | 1/2008 |
|---|---|---|
| JP | 2009525687 A | 7/2009 |

(Continued)

OTHER PUBLICATIONS

Alexis Michael Tourapis, Karsten Suhring, Gary Sullivan: "H.264/MPEG-4 AVC Reference Software Enhancements" Joint Video Team (JVT) of ISO/IEC MPEG & ITU-T VCEG(ISO/IEC JTC1/SC29/WG11 and ITU-T SG16 Q6), XX, XX, No. JVT-N008, Jan. 17, 2005, XP040419402 section V.

(Continued)

*Primary Examiner* — Sath V Perungavoor
*Assistant Examiner* — Xiaolan Xu
(74) *Attorney, Agent, or Firm* — Brent Boyd

(57) ABSTRACT

In generally, techniques are described for efficiently selecting a prediction mode by which to predict predictive video data from reference video data. In particular, an apparatus may include a memory that stores at least a first and second reference coded unit that each includes a first and second reference video data unit, respectively. The apparatus may further comprise a motion compensation unit that performs default weighted prediction to predict a first version of a predictive video data unit from the first and second reference video data units and calculates an offset value for the first version of the predictive video data unit. The motion compensation unit may then perform, based on the calculated offset value, either implicit weighted prediction or explicit weighted prediction to predict a second version of the predictive video data unit and encode the predictive video data unit as either the first or second version.

39 Claims, 6 Drawing Sheets

(56) References Cited

FOREIGN PATENT DOCUMENTS

| WO | WO2007092215 | 8/2007 |
|---|---|---|
| WO | WO2008048487 | 4/2008 |

OTHER PUBLICATIONS

Boyce, J M: "Weighted prediction in the H.264/MPEG AVC video coding standard" Proceedings—IEEE International Symposium on Circuits and Systems—2004 IEEE International Symposium on Circuits and Systems—Proceedings; vol. I of V: Analog Signal Processing 2004 Institute of Electrical and Electronics Engineers Inc. US, IEEE, May 23, 2004, pp. III-789 to III-792, XP010719383 ISBN: 978-0-7803-8251-0 the whole document.

Debing Liu et al: "Linear Transform Based Motion Compensated Prediction for Luminance Intensity Changes" IEEE May 23, 2005, pp. 304-307, XP010815538 ISBN: 978-0-7803-8834-5 *section 2*.

International Preliminary Report on Patentability—PCT/US2009/059698, The International Bureau of WIPO—Geneva, Switzerland, Jan. 10, 2011.

International Search Report & Written Opinion—PCT/US09/059698, International Search Authority—European Patent Office—Mar. 26, 2010.

Panchal R et al: "Simulation results and comments on Cleaned up KTA2.0 software" 36. VCEG Meeting; Aug. 10, 2008-Oct. 10, 2008; San Diego, US; (Video Coding—Experts Group of ITU-T SG.16),, Oct. 7, 2008, XP030003647 cited in the application the whole document.

Peng Yin et al: "Localized Weighted Prediction for Video Coding" IEEE May 23, 2005, pp. 4365-4368, XP010816640 ISBN: 978-0-7803-8834-5 *sections II and III*.

Shen, Y. et al: "Adaptive weighted prediction in video coding" 2004 IEEE International Conference on Multimedia and Expo (ICME)—June 27-30, 2004—Taipei, Taiwan, IEEE—Piscataway, NJ, USA, vol. 1, Jun. 27, 2004, pp. 427-430, XP010770802, ISBN: 978-0-7803-8603-7, sections 2, 3 and 4.

Thomas Wiegand et al: "Rate—Distortion Optimized Mode Selection for Very Low Bit Rate Video Coding and the Emerging H.263 Standard" IEEE Transactions on Circuits and Systems for Video Technology, IEEE Service Center, Piscataway, NJ, US, vol. 6, No. 2, Apr. 1, 1996, XP011014299 ISSN: 1051-8215 *sections II and III*.

Panchal et al., "Experimental Results on Simplified JMKTA 2.0 Software", (which was presented at the 36th Meeting in San Diego, California occurring during Oct. 8-10, 2008), submission numbered VCEG-AJ25.

"Advanced video coding for generic audiovisual services," Series H: Audiovisual and Multimedia Systems Infrastructure of audiovisual services—Coding of moving video, ITU-T Recommendation H.264 (Mar. 2005). pp.

Richardson, Iain, "H.264 and MPEG-4 Video Compression Video Coding for Next-generation Multimedia", Wiley, 2003, pp. 211-212.

Taiwan Search Report—TW098133859—TIPO—Nov. 27, 2012.

Hayase K., et al., "Weighted Prediction of Spatial Scalable Video Coding using Inter-Layer Correlation," The Institute of Electronics, Information and Communication Engineers Information and System society, human communication, Aug. 22, 2007, pp. 253-256.

Ikai T., et al., "A Study on Improvement of Bi-Prediction," The Proceedings of the 22nd Picture coding symposium of Japan, Oct. 31, 2007, pp. 47-48.

Tourapis AM., et al., "Proposed Amended H.264/MPEG-4 AVC Reference Software Manual," Document: JVT-N008, Joint Video Team (JVT) of ISO/IEC MPEG & ITU-T VCEG (ISO/IEC JTC1/SC29NVG11 and ITU-T SG16 Q.6), Jan. 24, 2005, p. 62.

* cited by examiner

EFFICIENT PREDICTION MODE SELECTION

This application claims the benefit of U.S. provisional application No. 61/103,100, filed Oct. 6, 2008, the entire content of which is incorporated herein by reference.

TECHNICAL FIELD

The disclosure relates to digital video and, more particularly, techniques for coding digital video data.

BACKGROUND

A number of video encoding and decoding techniques have been developed for encoding and decoding digital video data. The Moving Picture Experts Group (MPEG), for example, has developed several techniques including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video standards support efficient transmission and storage of video data by encoding data in a compressed manner to reduce the amount of data.

Video compression may involve spatial and/or temporal prediction to reduce redundancy inherent in video sequences. Intra-coding uses spatial prediction to reduce spatial redundancy of video blocks within the same video frame. Inter-coding uses temporal prediction to reduce temporal redundancy between video blocks in successive video frames. For inter-coding, a video encoder performs motion estimation to generate motion vectors indicating displacement of video blocks relative to corresponding prediction video blocks in one or more reference frames.

A source device may employ one of the above video encoding techniques to encode the digital video data. The source device archives the encoded video data and/or transmits the encoded video data to a destination device via a transmission channel. The transmission channel may make use of wired and/or wireless communication media. The destination device receives the encoded video data and decodes the received video data to recover the original digital video data for playback. Many devices include both an encoder and a decoder, which may be combined in so-called codec.

SUMMARY

In general, this disclosure describes techniques for efficiently selecting a prediction mode by which to predict, from at least two reference coded units, a third coded unit of video data, which may be referred to as a predictive coded unit. Reference coded units refer to coded units that have been previously coded and which provide a basis from which to predict the predictive coded unit. Notably, these reference coded units may reside either before or after the predictive coded unit temporally. Typically, a video encoder implements the techniques to improve coding efficiency by reducing a number of predictive coding passes required to select a prediction mode. As the techniques may reduce a number of coding passes, which may generally be referred to as computational operations, necessary to select an appropriate prediction mode, the techniques may also promote efficient power consumption. In other words, the video encoder may intelligently pre-select a prediction mode from a plurality of prediction modes without having to implement each and every one of the prediction modes and then perform comparative analysis on the results of each prediction to select a most appropriate prediction mode of the plurality.

More particularly, the video encoder may implement the techniques of this disclosure to efficiently select a motion-compensated bi-directional prediction mode by which to predict a video data units of a particular type of predictive coded unit referred to as a B-frame. As one example, within the ITU-T H.264 standard and its counterpart the ISO/IEC MPEG-4, Part 10, i.e., Advanced Video Coding (AVC) standard, three motion-compensated bi-directional prediction modes are defined for predicting a video data units of a B-frame. Each of these bi-directional prediction modes predict the video data unit of the B-frame from at least two reference video data units, where each of the reference video data units are included within separate or different reference coded units, such as either an I-frame or a P-frame, that occur either before or after the B-frame temporally in the video data.

The first mode is referred to as a default weighted prediction mode, which applies default or known weights to each of the reference blocks to, for example, average the pixel values of the reference video unit and thereby predict the predictive video data unit of the B-frame. The second mode is referred to as an explicit weighted prediction mode, where weights are explicitly defined by the video encoder and used to tailor prediction of the predictive video data unit. The third mode is referred to as an implicit weighted prediction mode, where weights are implicitly determined by the video encoder through analysis of the reference coded units or reference video data units of the reference coded units respectively to predict the predictive coded unit.

The video encoder may, in accordance with the techniques of this disclosure, efficiently perform only two of these three prediction modes to generate only two versions of the third coded unit, rather than perform all three of these prediction modes to generate three versions. As a result, the video encoder may only need to analyze two versions rather than three to determine which of the two versions more appropriately represents a corresponding portion of the video data. In this respect, the video encoder may reduce the number of computational operations, e.g., prediction coding passes, while also promoting efficient power consumptions.

In one aspect, a method of encoding video data, the method comprising receiving first and second reference coded units of the video data, wherein each of the first and second coded units each comprise respective first and second reference video data units, performing default weighted prediction to predict a first version of a predictive video data unit of a predictive coded unit of the video data from the first and second reference video data units, wherein each of the two reference coded units occur either temporally before or after the predictive coded unit and calculating an offset value for the first version of the predictive video data unit. The method further comprising selecting, based on the calculated offset value, either an implicit or explicit weighted prediction mode, performing the selected mode to predict a second version of the predictive video data unit from the first and second reference video data units and encoding the predictive video data unit as either the first version or the second version.

In another aspect, an apparatus that encodes video data, the apparatus comprising a video encoder that includes a memory that stores a first and second reference coded units, wherein the first reference coded unit includes a first reference video data unit and the second reference coded unit includes a second reference video data unit, and a motion compensation unit. The motion compensation unit performs default weighted prediction to predict a first version of a predictive video data unit of a predictive coded unit of the video data from the first and second reference video data units, wherein each of the two reference coded units occur either temporally before or after the predictive coded unit, calculates an offset value for the first version of the predictive video data unit, select, based on the calculated offset value, either an implicit or explicit weighted prediction mode, perform the selected mode to predict a second version of the predictive video data unit from the first and second reference video data units and encodes the predictive video data unit as either the first version or the second version.

In another aspect, a device that encodes video data, the device comprising means for encoding video data. The means for encoding video data includes means for storing a first and second reference coded units of the video data, wherein the first reference coded unit includes a first reference video data unit and the second reference coded unit includes a second reference video data unit, and means for performing default weighted prediction to predict a first version of a predictive video data unit of a predictive coded unit of the video data from the first and second reference video data units, wherein each of the two reference coded units occur either temporally before or after the predictive coded unit. The means for encoding video data includes means for calculating an offset value for the first version of the predictive video data unit, means for performing, based on the calculated offset value, either, but not both, implicit weighted prediction or explicit weighted prediction to predict a second version of the predictive video data unit from the first and second reference video data units, and means for encoding the predictive video data unit as either the first version or the second version.

In another aspect, a computer-readable medium comprising instructions for causing a programmable processor to receive first and second reference coded units of the video data, wherein each of the first and second coded units each comprise respective first and second reference video data units, perform default weighted prediction to predict a first version of a predictive video data unit of a predictive coded unit of the video data from the first and second reference video data units, wherein each of the two reference coded units occur either temporally before or after the predictive coded unit, calculate an offset value for the first version of the predictive video data unit, select, based on the calculated offset value, either an implicit weighted prediction mode or an explicit weighted prediction mode, perform the selected mode to predict a second version of the predictive video data unit from the first and second reference video data units, and encode the predictive video data unit as either the first version or the second version.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
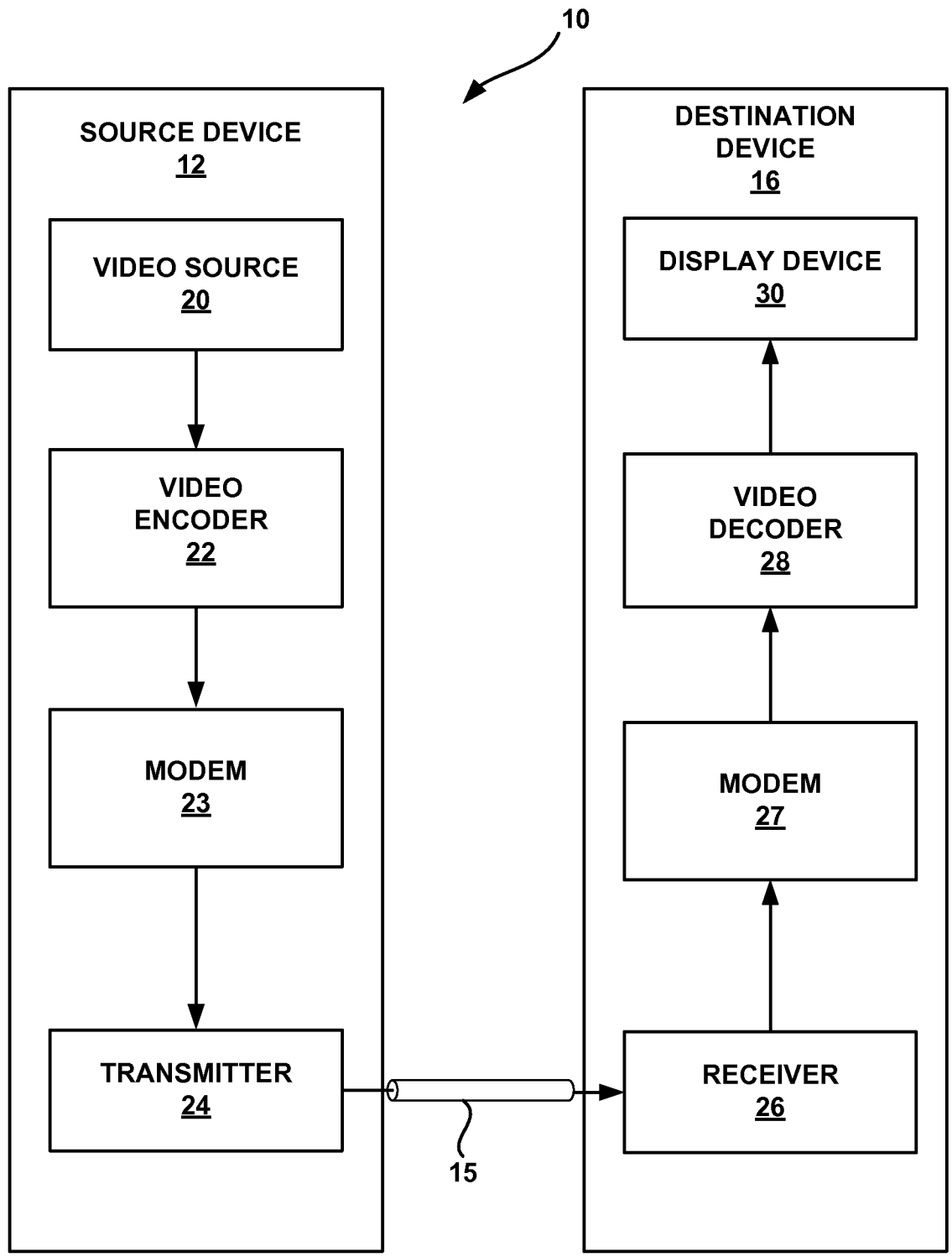
FIG. 1 is a block diagram illustrating one exemplary video encoding and decoding system that may implement techniques of this disclosure.

Generally, this disclosure describes techniques for efficiently selecting a prediction mode by which to predict, from at least two reference coded units, a third coded unit of video data, which may be referred to as a predictive coded unit. Reference coded units refer to coded units that have been previously coded and which provide a basis from which to predict the third coded unit. Notably, these reference coded units may reside either before or after the third coded unit temporally. Typically, a video encoder implements the techniques to improve coding efficiency by reducing a number of predictive coding passes required to select a prediction mode. As the techniques may reduce a number of coding passes, which may generally be referred to as computational operations, necessary to select an optimal or more appropriate prediction mode, the techniques may also promote efficient power consumption. In other words, the video encoder may intelligently pre-select a prediction mode from a plurality of prediction modes without having to implement each and every one of the prediction modes and then perform comparative analysis on the results of each prediction to select a most appropriate prediction mode.

More particularly, the video encoder may implement the techniques of this disclosure to efficiently select a motion-compensated bi-directional prediction mode by which to predict a video data units of a particular type of predictive coded unit referred to as a B-frame. As one example, within the ITU-T H.264 standard and its counterpart the ISO/IEC MPEG-4, Part 10, i.e., Advanced Video Coding (AVC) standard, three motion-compensated bi-directional prediction modes are defined for predicting a video data units of a B-frame. Each of these bi-directional prediction modes predict the video data unit of the B-frame from at least two reference video data units, where each of the reference video data units are included within separate or different reference coded units, such as either an I-frame or a P-frame, that occur either before or after the B-frame temporally.

The first mode is referred to as a default weighted prediction mode, which applies default or known weights to each of the reference blocks to, for example, average the pixel values of the reference video unit and thereby predict the predictive video data unit of the B-frame. The second mode is referred to as an explicit weighted prediction mode, where weights are explicitly defined by the video encoder. The third mode is referred to as an implicit weighted prediction mode, where weights are implicitly determined by the video encoder through analysis of the reference coded units or reference video data units of the reference coded units respectively to predict the predictive coded unit. With respect to the explicit weighted prediction mode, the video encoder explicitly encodes the weights, hence the name "explicit" weighted prediction. With respect to the implicit weighted prediction mode, the video encoder does not explicitly encode the weights, rather the decoder utilizes the same weight determination algorithm as that used by the video encoder to determine the weights. In other words, the video encoder implicitly encodes the weights, and requires the decoder to perform additional operations to determine the same weights, rather than explicitly encode the weights and thereby alleviate the decoder from having to perform these additional operations.

The video encoder may, in accordance with the techniques of this disclosure, efficiently perform only two of these three prediction modes to generate only two versions of the third coded unit, rather than perform all three of these prediction modes to generate three versions. As a result, the video encoder may only need to analyze two versions rather than three to determine which of the two versions more appropriately represents a corresponding portion of the video data. In this respect, the video encoder may reduce the number of computational operations, e.g., prediction coding passes, while also promoting efficient power consumptions.

FIG. 1 is a block diagram illustrating one exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any wireless devices that can communicate video information over a communication channel 15, in which case communication channel 15 is wireless. The techniques of this disclosure, however, which concern efficient selection of a prediction algorithm or mode that predicts coded units, are not necessarily limited to wireless applications or settings.

In the example of FIG. 1, source device 12 may include a video source 20, video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to apply one or more of the efficient selection techniques of this disclosure as part of a video encoding process.

The illustrated system 10 of FIG. 1 is merely exemplary. The efficient selection techniques of this disclosure may be performed by any encoding device that supports motion compensated prediction. Source device 12 and destination device 16 are merely examples of such coding devices in which source device 12 generates coded video data for transmission to destination device 16. Devices 12, 16 may operate in a substantially symmetrical manner such that, each of devices 12, 16 include video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. Again, the video encoding process may implement one or more of the techniques described herein to efficiently predict a coded unit during motion compensation. The information communicated over channel 15 may include information defined by video encoder 22, which is also used by video decoder 28. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). The techniques of this disclosure, however, are not limited to any particular coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Recently, work to advance the H.264/MPEG-4 AVC standard has begun in various forums of the ITU-T, such as the Key Technologies Area (KTA) forum. The KTA forum seeks, in part, coding technologies that exhibit higher coding efficiency that that exhibited by the H.264/AVC standard. The techniques described in this disclosure may provide for more efficient selection of prediction modes than that provided for in the H.264/AVC standard. Recently, the KTA forum received a document detailing these techniques in various aspects as a submission numbered VCEG-AJ25, titled "Experimental Results on Simplified JMKTA 2.0 Software", by Rahul Panchal and Marta Karczewicz (which was presented at the 36$^{th}$ Meeting in San Diego, Calif. occurring during Oct. 8-10, 2008), which is hereby incorporated by reference in its entirety.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, a group of pictures (GOPs), or another independently decodable unit defined according to the coding techniques used.

Following inter-based predictive coding (which includes interpolation and the techniques of this disclosure to efficiently select a prediction algorithm or mode by which to predict a coded unit), and following any transforms (such as the 4×4 or 8×8 integer transform used in H.264/AVC or a discrete cosine transform or DCT), quantization may be performed. Quantization generally refers to a process in which coefficients are quantized to possibly reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

According to the techniques of this disclosure, video encoder 22 may select at least two different reference coded units of the video data. These two coded units may comprise a first frame and a second frame different from a first frame. Alternatively, video encoder 22 may select a first reference video data unit, e.g., a macroblock or any other size video data unit, of the first reference frame and a second reference video data unit of the second reference frame. For purposes of illustration, the techniques of the disclosure are described below with respect to video blocks and frames. However, the techniques may apply generally to entire coded units, or to portions thereof, such as video data units of coded units.

In some aspects, video encoder 22 may store a first set of reference frames, which may be collectively referred to as list zero (0), and a second set of reference frames, which may be collectively referred to as list one (1), where each of the sets include reference frames different from the reference frames of the other set. Video encoder 22 may select one or more reference frames from list 0 and one or more reference frames from list 1. In this respect, video encoder 22 may receive at least two different reference frames of the video data.

After selecting the reference frames, video encoder 22 may perform default weighted prediction to predict a first version of a predictive video block of a predictive frame of the video data from at least two reference video blocks, each selected from a different one of the at least two different reference frames. Notably, the two reference frames are temporally distant from the predictive frame. Likewise, the at least two reference video blocks are temporally distant from the predictive video block. In other words, the reference frames (and the reference video blocks selected form these reference frames) of the first set of reference frames may comprise reference frames that occur in time sequentially or temporally either before or after or both before and after the predictive frame. Likewise, the reference frames (and the reference video blocks selected from these reference frames) of the second set of reference frames may comprise frames that occur in time sequentially or temporally either before or after or both before and after the predictive frame.

Video encoder 22 may therefore select a first reference frame that occurs temporally before or after the predictive frame from list 0 and a second reference frame that occurs temporally before or after the predictive frame from list 1. Predictive frames predicted from these two selected units are often referred to as bi-directional-frames or -pictures (B-frames or B-pictures, for short) in that the predictive frame is predicted from both temporal directions, e.g., both reference units that occur before and after the predictive frame. While referred to as "B-frames" for this reason, B-frames may also, in various aspects, be predicted from two reference frames that occur prior to the B-frame or, alternatively, from two references frames that occur after the B-frame.

Typically, a B-frame is predicted in this manner on a block-by-block basis and video encoder 22 may select a first reference video block from the first reference frame and a second video block from the second reference frame. To select these blocks, video encoder 22 may identify the first and second blocks as those that best match the predictive video block or exhibit similar pixel values to that of the predictive video block. Video encoder 22 may then perform default weighted prediction to predict a first version of a predictive video block of the predictive from the first and second reference video blocks of the first and second reference frames, respectively.

To perform default weighted prediction, video encoder 22 may multiple the first reference video block by a first weight to determine a first weighted video block and the second reference video block by a second weight to determine a second weighted video block. Video encoder 22 may next add the first weighted video block with the second weighted video block to generate a total weighted video block. Video encoder 22 may predict the first version of the predictive video block in accordance with the default weighted prediction algorithm by dividing the total weighted video block by the number of reference video blocks selected for predicting the first version of the predictive video block, which is two in this instance, e.g., the first and second reference video blocks. Typically, the first and second weights are equal to one another, e.g., the first weight equals 0.5 or 50% and the second weight equals 0.5 or 50%. For more than two weights, the weights may only approximately equal one another, e.g., a first weight equals 33.33%, a second weight equals 33.33% and a third weight equals 33.34%. As the weights do not customarily vary, this form of weighted prediction may be referred to as straight, default, or equally weighted prediction.

After calculating, determining or otherwise predicting the first version of the predictive video block using the default weighted prediction algorithm, video encoder 22 may calculate an offset value for the predictive video block. This offset value may comprise a DC offset or any other offset value. In the above offset, "DC" refers to an offset from a given direct current in the electrical sense, but has since been adapted for use by a wide number of contexts outside of the electrical context.

In the context of video encoding, a DC offset may be calculated by video encoder 22 first averaging a luma component of pixel values for one of the reference video blocks. Video encoder 22 may next average a luma component of pixel values for the predictive video block. Each of these calculated values may comprise a DC value. Video encoder 22 may then compute the DC offset by subtracting the DC values from one another. In this respect, the DC values may comprise an average luminance of the one of the reference video block and the predictive video block respectively. This average is similar to the DC voltage in the electrical context. The difference between these two average DC values may therefore comprise an offset from the standard DC value, much as a DC offset in the electrical context represents an offset from the standard or average DC value, hence the name "DC offset."

In any event, video encoder 22 may then perform either implicit weighted prediction or explicit weighted prediction to predict a second version of the predictive video block of the predictive frame. To determine which of either the implicit or explicit weighted prediction to perform, video encoder 22 may compare the calculated DC offset to a threshold value and based on this comparison perform either implicit or explicit weighted prediction. For example, video encoder 22 may compare the calculated DC offset to a threshold value, which is typically zero (0). Video encoder 22 may alternatively first determine an absolute value of the calculated DC offset and compare this absolute value of the DC offset to the threshold value, which again may typically be set to zero (0). Based on the comparison, video encoder 22 may then perform either implicit or explicit weighted prediction to predict the second version of the predictive video block of the predictive frame.

"Implicit" or "explicit" weighted prediction refers to a form of prediction where the two or more weights used in predicting the predictive frame, for example, are encoded within the coded unit or not. For implicit weighted prediction the weights are not encoded and therefore may be implicit in the predictive video block. Video decoder 26 may then derive, upon determining that the predictive video block is predicted using implicit weighted prediction, the weights through analysis of the first and second reference video blocks or, in some instances, analysis of the first and second reference frames. In explicit weighted prediction, video encoder 22 may explicitly code the weights used in predicting the predictive video block within the predictive video block, or in some instances, within the predictive frame. Explicit weighted prediction may provide video encoder 22 more latitude in selecting the weights and, as a result, may enable video encoder 22 to tailor prediction of the predictive frame, e.g., a B-frame, to suit a particular context or form of video data.

As an example of performing either implicit or explicit weighted prediction based on the weights, video encoder 22 may perform explicit weighted prediction to predict the second version of the predictive video block when the absolute value of the calculated DC offset value exceeds the threshold value. However, when the absolute value of the calculated DC offset value does not exceed the threshold value, i.e., is less than or equal to the threshold value, video encoder 22 may perform implicit weighted prediction to predict the second version of the predictive video block. In this manner, video encoder 22 may perform either, but not both, implicit or explicit weighted prediction to predict the second version of the predictive video block based on the calculated offset value.

Upon predicting the second version of predictive video block, video encoder 22 encodes the predictive video block as either the first version or the second version. Video encoder 22 may, in some instances, perform a cost analysis, such as a rate-distortion (R-D) cost analysis, of the first and second versions of the predictive video block in order to select which of the first and second versions more appropriately encode a corresponding portion of the video data. Again, video encoder 22 encodes the first version of the video block by performing default weighted prediction and encodes the second version of the predictive video block by performing either, but not both, of explicit or implicit weighted prediction.

Video encoder 22 may select the one of the first and second versions that are associated with the lowest cost. In any event, video encoder 22 encodes the predictive video block as either the first version or the second version within the coded bitstream. Transmitter 24 of source device 12 may transmit the coded bitstream to receiver 26 of destination device 16. In destination device 16, video decoder 28 receives the coded bistream and decodes the coded bitstream to reconstruct the video sequence.

In this manner, video encoder 22 may implement the techniques described in this disclosure to more efficiently select between a plurality of prediction algorithms or modes without actually generating a version of the predictive video block by performing each of the prediction algorithms. As described above, video encoder 22 may first perform a default weighted prediction and next perform either, but not both, an implicit or explicit weighted prediction. Thus, rather than perform all three forms or types of prediction, video encoder 22 performs only two of the three, default and either, but not both, explicit or implicit weighted prediction. In this respect, video encoder 22 may more efficiently select between three or more prediction modes without having to perform each and every one of the three or more prediction modes.

Video encoder 22 may, again as described above, select between performing either the implicit or explicit weighted prediction to predict a second version of the predictive video block of the B-frame based on an offset calculated for the first version of the predictive video block of a B-frame While described in this disclosure with respect to an offset, any characteristic commonly accessible or determinable by video encoder 22 may be used by video encoder 22 as a basis for the selection between performing implicit or explicit weighted prediction.

Figure 2:
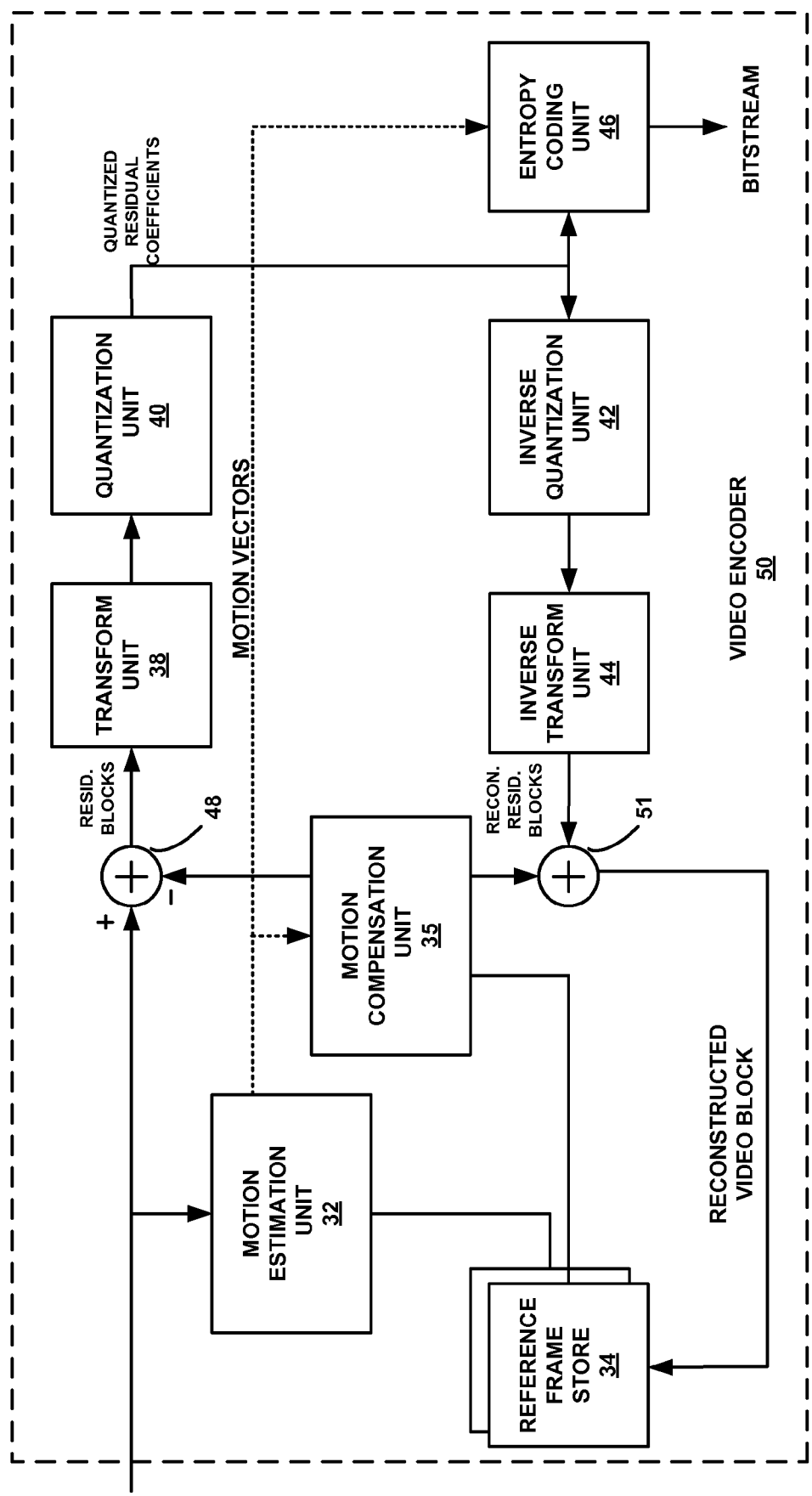
FIG. 2 is a block diagram illustrating an example of a video encoder that may perform offset techniques consistent with this disclosure.

FIG. 2 is a block diagram illustrating an example of a video encoder 50 that may perform offset techniques consistent with this disclosure. Video encoder 50 may correspond to video encoder 22 of device 20, or a video encoder of a different device. Video encoder 50 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode and Inter-modes such as prediction (P-mode) or bi-directional (B-mode) may refer to the temporal based compression modes. The techniques of this disclosure apply during inter-coding, and therefore, intra-coding units such as spatial prediction unit are not illustrated in FIG. 2 for simplicity and ease of illustration.

As shown in FIG. 2, video encoder 50 receives a current video block within a video frame to be encoded. In the example of FIG. 2, video encoder 50 includes motion estimation unit 32, a motion compensation unit 35, a reference frame store 34, an adder 48, a transform unit 38, a quantization unit 40, and an entropy coding unit 46. For video block reconstruction, video encoder 50 also includes an inverse quantization unit 42, an inverse transform unit 44, and an adder 51. Video encoder 50 may also include a deblocking filter (not shown) to filter block boundaries to remove blockiness artifacts from reconstructed video. If desired, the deblocking filter would typically filter the output of adder 51.

During the encoding process, video encoder 50 receives a video block to be coded, and motion estimation unit 32 and motion compensation unit 35 perform inter-predictive coding. Motion estimation unit 32 and motion compensation unit 35 may be highly integrated, but are illustrated separately for conceptual purposes. Motion estimation is typically considered the process of generating motion vectors, which estimate motion for video blocks. A motion vector, for example, may indicate the displacement of a predictive block within a predictive frame (or other coded unit) relative to the current block being coded within the current frame (or other coded unit). Motion compensation is typically considered the process of fetching or generating the predictive block based on the motion vector determined by motion estimation. Again, motion estimation unit 32 and motion compensation unit 35 may be functionally integrated. For demonstrative purposes, the techniques described in this disclosure are described as being performed by motion compensation unit 35.

Motion estimation unit 32 selects the appropriate motion vector for the video block to be coded by comparing the video block to video blocks of one or more predictive coded unit (e.g., a previous and/or future frame in terms of time or temporally). Motion estimation unit 32 may, as an example, select a motion vector for a B-frame in a number of ways. In one way, motion estimation unit 32 may select a previous or future frame from a first set of frames (referred to as list 0) and determine a motion vector using only this previous or future frame from list 0. Alternatively, motion estimation unit 32 may select a previous or future frame from a second set of frames (referred to as list 1) and determine a motion vector using only this previous or future frame from list 1. In yet another way, motion estimation unit 32 may select a first frame from list 0 and a second frame from list 1 and select one or more motion vectors from the first frame of list 0 and the second frame of list 1. This form of prediction may, as mentioned above, be referred to as bi-predictive motion estimation. The techniques of this disclosure may be implemented so as to efficiently select a motion-compensated bi-prediction mode.

According to the H.264/AVC standard, three motion-compensated bi-predictive algorithms or modes may be used to predict a B-frame or portions thereof, such as video blocks, macroblocks or any other discreet and/or contiguous portion of a B-frame. A first motion-compensated bi-predictive algorithm or mode, which is commonly referred to as default weighted prediction, may involve applying approximately equal weights to each identified video block of the first frame of list 0 and the second frame of list 1. The weighted blocks of the first and second frames are then added together and divided by the total number of frames used to predict the B-frame, e.g., two in this instance. Often, this division is accomplished by adding 1 to the addition of the weighted blocks of the first and second frames and then shifting the result to the right by one bit.

The second motion-compensated bi-predictive algorithm or mode, which is commonly referred to as explicit weighted prediction, may involve determining weights for each identified video block of the first and second frames and then performing a similar multiplication of the weights to generate the weighted blocks and addition to that described above with respect to the default weighted prediction algorithm. With respect to explicit weighted prediction, however, an additional one or more rounding values or offsets may be added prior to shifting the sum of the first and second weighted blocks to the right by one or some other number to ensure an appropriate division by the total number of frames used to predict the third coded unit or B-frame.

The third motion-compensated bi-predictive algorithm or mode, which is commonly referred to as implicit weighted prediction, may involve determining weights for each identified blocks according to a set algorithm, which may, for example, analyze each of the first and second blocks to determine the first and second weights. Once determined, this algorithm may apply or otherwise multiply the first and second blocks by the respectively determined first and second weights to generate first and second weighted blocks. After determining the weighted blocks, the algorithm may next add the weighted blocks together along with a rounding value or offset prior to shifting the sum by a value which ensures a division by the total number of frames used to predict the B-frame.

Motion compensation unit 35 may implement each of these motion-compensated bi-predictive algorithms to generate predictive data representative of a bi-predictive block of a B-frame. For example, motion compensation unit 32 may implement default weighted prediction in accordance with the following equation (1):

$$\text{pred}(i,j) = (\text{pred0}(i,j) + \text{pred1}(i,j) + 1) >> 1 \quad (1).$$

Pred(i,j) refers to predictive data representative of a video block in the i-th row and j-th column of the predictive frame, e.g., B-frame. Pred0(i,j) refers to data representative of a video block in the i-th row and j-th column of a first reference frame, where the first reference frame is selected from list 0. Pred1(i,j) refers to data representative of a video block in the i-th row and j-th column of a second reference frame, where the first reference frame is selected from list 1. As the weights are equal or approximately equal, adding one in equation (1) and shifting (>>) to the right by one bit effectively divides the sum of pred0(i,j)+pred1(i, j) by two, e.g., the total number of frames or video blocks used to predict the predictive video block of the B-frame.

Motion compensation unit 35 may implement the second motion-compensated bi-predictive algorithm or explicit weighted prediction in accordance with the following equation (2):

$$pred(i,j)=(pred0(i,j)*w0+pred1(i,j)*w1+2^r)>>(r+1)+ \\ ((o1+o2+1)>>1) \quad (2).$$

Again, each of pred(i,j), pred0(i,j) and pred1(i,j) refer to the same reference video blocks described above with respect to equation (1). As the weights are determined and may not be approximately equal, equation (2) includes weights w0 and w1, which are multiplicatively applied to respective pred0(i,j) and pred1(i,j). The "r" variable may represent an integer number selected to ensure the weights w0 and w1 result in an integer number. The variables o1 and o2 each represent a rounding offset, where equation (2) provides for an average of rounding offsets o1 and o2 through the addition of the rounding offsets and one, followed by a shift to the right by one (1). The weighted sum of the blocks may also be shifted prior to the addition of the average of the rounding offsets to ensure an appropriate division by the total number of reference video blocks used to predict the predictive video block of the B-frame.

Motion compensation unit 35 may implement the third motion-compensated bi-predictive algorithm or implicit weighted prediction in accordance with the following equation (3):

$$pred(i,j)=(pred0(i,j)*w0+pred1(i,j)*w1+32)>>6 \quad (3).$$

Again, each of pred(i,j), pred0(i,j) and pred1(i,j) refer to the same reference video blocks described above with respect to equations (1) and (2). As the weights are determined and may not be approximately equal, equation (3) includes weights w0 and w1, which are multiplicatively applied to respective pred0(i,j) and pred1(i,j). The value "32" may comprise a static rounding offset used to ensure the weights w0 and w1 are integers and the shift to the right (>>) by six (6) may represent a division, given the rounding offset of 32, that effectively divides the sum of the total weighted blocks by the total number of frames used to predict the predictive video block of the B-frame.

In accordance with the techniques of this disclosure, motion estimation unit 32 may select at least two frames by which to determine motion vectors for a B-frame. Particularly, as described above, reference frame store 34 may comprise a memory to store a first set of reference frames of the video data referred to as list 0 and a second set of reference frames of the video data referred to as list 1. The references frames of list 1 and list 0 may each comprise I-frames or P-frames. Motion estimation unit 32 may access reference frame store 34 and select one or more reference frames from list 0 and one or more reference frames from list 1. In this manner, motion estimation unit 32 may, in one aspect, select at least two coded units, e.g., frames, of the video data.

Motion estimation unit 32 may then determine motion vectors for a first block of a predictive B-frame. Motion estimation unit 32 may identify a first corresponding block in a first one of the at least two reference frames that corresponds to the predictive block of the B-frame and a second corresponding block in a second one of the at least two reference frames that corresponds to the predictive block of the B-frame. Typically, the first frame and the second frame are respectively temporally distant from the third B-frame. Often, the first reference frame resides in the video sequence prior to or before the B-frame, while the second reference frame resides in the video sequence after the B-frame. In some instances, however, both the first and second reference frames may reside or occur at different times before or after the B-frame. In any event, motion estimation unit 32 may then calculate the motion vectors based on the first reference block from the first reference frame and the second reference block from the second reference frame, both of which are determined relative to the third predictive block of the predictive B-frame.

Once motion estimation unit 32 has selected the motion vectors for the video block to be coded, motion compensation unit 35 generates the predictive video block associated with these motion vectors. Motion compensation unit 35 may generate a first version of the predictive video block of the B-frame in accordance with the default weighted predictive algorithm, as represented by the above equation (1). To do so, motion compensation unit 35 may retrieve the various reference blocks specified by equation (1) from reference frame store 34 and implement equation (1) to generate predictive data representative of the predictive video block of the B-frame. Next, motion compensation unit 35 may calculate the above DC offset value or another offset value for the first version of the predictive video block of the B-frame.

In one example, motion compensation unit 35 may calculate a first set of metrics (e.g., mean values) respectfully associated with each integer and sub-integer pixel location for the reference video blocks of the first and second reference frames that are used to predict the predictive video block. Motion compensation unit 35 may also calculate a second set of metrics (e.g., mean values or a difference between the sum of luminance values and/or chrominance values) respectfully associated with each integer and sub-integer pixel location for the predictive video block. Motion compensation unit 35 then calculates the offset values based on the first and second sets of metrics. Motion compensation unit 35 may, for example, calculate a first DC offset as the difference between the mean values calculated for the first reference video block and the predictive video block. Motion compensation unit 35 may next calculate a second DC offset as the different between the mean values calculated for the second reference video block and the predictive video block. Motion compensation unit 35 may then calculate an average of these first and second DC offsets to generate an average DC offset. The offset values may comprise absolute values or signed values which may reflect an upward or downward bias of the pixel values of a corresponding video block, which again may be very useful for indicating scene changes or flashes encountered in video encoding.

In other words, the first set of metrics may comprise a set of mean values that correspond to the mean of pixel values at each integer and sub-integer pixel location of video blocks of a given coded unit. The second set of metrics may comprise a set of mean values that correspond to the mean of pixel values at each integer and sub-integer pixel location of predictive blocks used to predict the current blocks that are being coded in that coded unit. The plurality of offset values may comprise differences between the first set of mean values and the second set of mean values. Each macroblock location may be defined by a single pixel, e.g., the respective pixel in the upper left-hand corner of the respective macroblock. However, each macroblock may define sixteen pixel values that contribute to a particular mean value in the first set of mean values. Of course, these offset values may be calculated for other sized video blocks, as well.

Generally, the offset for any given position can be calculated as the difference between the mean of all pixels in the current frame (or other coded unit) that have motion vector precision corresponding to that pixel position or sub-pixel position, and the mean of the interpolated values of predictive data corresponding to that pixel position or sub-pixel position. Thus, each respective offset may be viewed as the average difference of pixels of the coded unit relative to predictive data for each respective integer, interpolated or extrapolated position of the data.

Motion compensation unit 35 may calculate the offset values with respect to luma blocks, chroma blocks or both. Different offsets may be defined for each integer and sub-integer pixel location associated with each type of video block (e.g., luma and chroma blocks). Furthermore, different offsets could be assigned to each block at each particular size, partition or sub-partition of each block.

After calculating the offset values, motion compensation unit 35 may compare the each of the individual offset values or the average offset value to a threshold value. The threshold value may be programmatically set by a user of video encoder 50 or statically set by a hardware designer of video encoder 50. In some instances, motion compensation unit 35 may automatically, e.g., without requiring any user oversight or input, set the threshold value based on some analysis of the various blocks of one or more of the first, second and third coded unit. In this respect, motion compensation unit 35 may automatically adapt or tailor the threshold value when performing the comparison. Typically, however, the designer or user programmatically sets the threshold value to zero (0). Based on this comparison, motion estimation unit 35 may perform either explicit or implicit weighted prediction in accordance with, for example, either of equations (2) or (3), respectively, to predict a second version of the third block of the B-frame.

For example, motion compensation unit 35 may perform explicit weighted prediction in accordance with equation (2) to predict a second version of the predictive block when the calculated offset value or, in some instances, an absolute value of the calculated offset value, exceeds the threshold value. Motion compensation unit 35 may use the default weights, e.g., the weights used during the default weighted prediction, for weights w0 and w1 to predict the third or predictive block of the B-frame. Moreover, when performing explicit weighted prediction, motion compensation unit 35, may in some aspects use the calculated offsets.

When the calculated offset values or, in some instances the absolute value of the calculated offset values, do not exceed, i.e., are less than or equal to, the threshold value, motion compensation unit 35 may perform implicit weighted prediction in accordance with equation (3) to predict the second version of the predictive video block of the B-frame. As described above with respect to default weighted prediction, motion compensation unit 35 may retrieve the various reference blocks specified by either equation (2) or (3) from reference frame store 34. Alternatively, motion compensation unit 35 may cache or otherwise maintain or store the various reference video blocks locally after first retrieving these blocks to calculate the first version of the predictive video block in accordance with the default weighted prediction algorithm, e.g., as represented by equation (1) above.

Regardless of whether the second version of the predictive video block of the B-frame is predicted in accordance with explicit or implicit weighted prediction, motion compensation unit 35 compares the first version of the predictive video block predicted by performing default weighted prediction and the second version of the predictive video block predicted by performing either explicit or implicit weighted prediction to one another and selects the version that more appropriately represents the corresponding portion of the video. Motion compensation unit 35 may, perform this comparison, perform a rate-distortion (R-D) analysis on the first and second versions. As described above, the R-D analysis may involve calculating a cost for each of the versions and selecting the one of the first and second versions for which a lower cost was calculated. This R-D analysis generally balances rate and distortion or better stated balances the amount of data used in encoding the first and second versions of the predictive video blocks versus some quantified level of quality, e.g., a level or amount of distortion.

As an example, motion compensation unit 35 may base the R-D analysis on a cost calculated for each of the first and second versions in accordance with the following equation (4) that provides a Langrangian cost function:

$$F_c = d + (\lambda^\circ * R) \tag{4}$$

$F_c$ comprises a variable representative of the cost function. The letter "d" comprises a variable representative of either the first or the second distortion value calculated by comparing the first and second version, respectively, to the corresponding portion of the video. Motion compensation unit 35 typically calculates or measures the first and second distortions as a mean squared error in order to maximize a peak signal-to-noise ration (PSNR). Lamda or "$\lambda^\circ$" comprises a variable representative of a Lagrangian multiplier, which is a value representing a relationship between bit cost and quality for a particular quality level. The letter "R" comprises a variable representative of a bit rate at which the video is encoded.

Motion compensation unit 35 may therefore calculate a first and second distortion value for the respective first and second versions of the predictive video block and store data that defines values for both the Lagrangian multiplier and the bit rate. For each of the first and second versions, motion compensation unit 35 may determine a cost according to equation (4) and compare these first and second costs to one another. Motion compensation unit 35 then selects one of the first and second versions based on the comparison of the first and second costs. In some aspects, motion compensation unit 35 selects the one of the first and second versions for which it determined the lower cost.

If motion compensation unit 35 selects the second version predicted by way of the explicit weighted prediction algorithm, motion compensation unit 35 may apply the DC offset values to original predictive video blocks to generate offset predictive video blocks, and encode video blocks of the coded unit based on the offset predictive video blocks. By adding offset to the pixel values of predictive blocks in a location-based manner according to pixel locations of the predictive blocks (integer location or one of a plurality of possible sub-integer pixel locations), the predictive blocks may be more similar to the blocks being coded, which can improve coding efficiency. Moreover, since offset values are defined differently for different pixel locations, these offset values may provide an ability to achieve segmentation among the coding of data associated with different types of interpolation. If, however, motion compensation unit 35 selects either the first version or the second version predicted by way of implicit weighted prediction, motion compensation unit 35 may encode the blocks without adding the calculated offset values. In this manner, motion compensation unit 35 may generate predictive data representative of a third or predictive video block of a B-frame.

Video encoder 50 then forms a residual video block by subtracting the prediction data from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. For example, a 16-bit value may be rounded down to a 15-bit value during quantization. In addition, quantization unit 40 may also quantize the different offsets in the case where the second version is predicted by way of explicit weighted prediction to allocate a desired number of bits to respective integer and fractional portions of the different offsets. In particular, quantization unit may for each of the offset values assign a first number of bits to an integer portion a given offset value and assign a second number of bits to a fractional portion of the given offset value, wherein the first and second numbers of bits are determined based on a magnitude of the integer portion. Entropy coding unit 46 may encode the first number of bits differently than the second number of bits.

Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding methodology. Following the entropy coding by entropy coding unit 46, the encoded video may be transmitted to another device or archived for later transmission or retrieval. The coded bitstream may include entropy coded residual blocks, motion vectors for such blocks, and other syntax including the offset values that identify the plurality of different offsets at different integer and sub-integer pixel locations within the coded unit.

Inverse quantization unit 42 and inverse transform unit 44 apply inverse quantization and inverse transformation, respectively, to reconstruct the residual block in the pixel domain, e.g., for later use as the reference block in the manner described above. Summer 51 adds the reconstructed residual block to the motion compensated prediction block produced by motion compensation unit 35 to produce a reconstructed video block for storage in reference frame store 34. The reconstructed video block may be used by motion estimation unit 32 and motion compensation unit 35 as a reference block to inter-encode a block in a subsequent video frame.

In this manner, video encoder 50 may implement the techniques of this disclosure to efficiently select between three motion-compensated bi-predictive algorithms. The selection is efficient insomuch that motion compensation unit 35 only performs two of the three motion-compensated bi-predictive algorithms rather than perform all three and then select the one of the three resulting versions that more appropriately represents the video data. Not only do the techniques therefore facilitate more efficient selection by eliminated performance of at least one of the algorithms, but also eliminate an additional R-D analysis cost function calculation as only the first and second versions are the subject of this analysis. In this respect, the techniques may be implemented by video encoder 50 to more efficiently select between the three motion-compensated bi-predictive algorithms.

Figure 3:
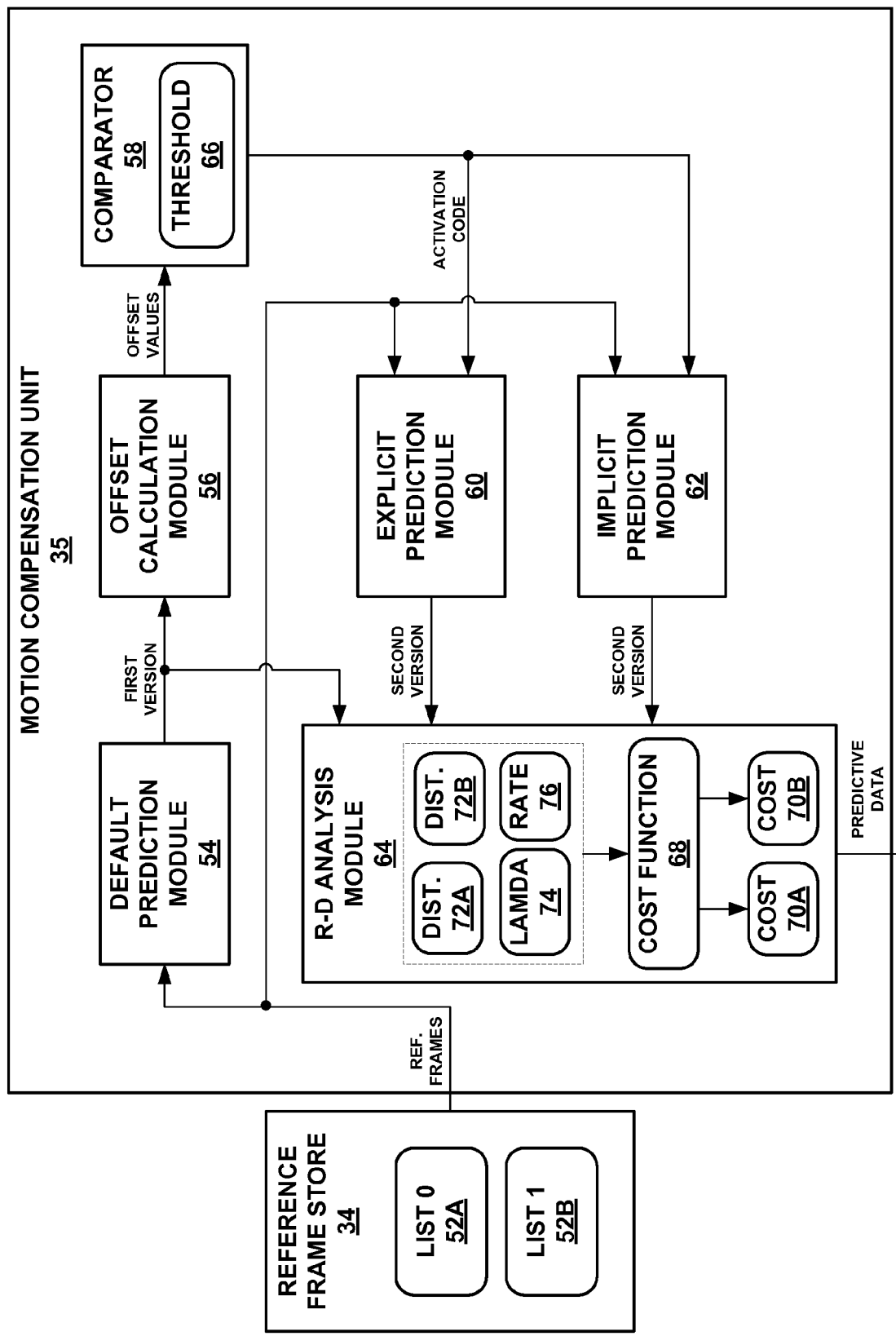
FIG. 3 is a block diagram illustrating an example of the motion compensation unit shown in FIG. 2 in more detail.

FIG. 3 is a block diagram illustrating an example of motion compensation unit 35 of FIG. 2 in more detail. As shown in the example of FIG. 3, motion compensation unit 35 couples to reference frame store 34, which stores the above described first and second sets of coded units or reference frames as list 0 52A and list 1 52B. Motion compensation unit 35 may first retrieve at least two reference frames from reference frame store 34. Typically, motion compensation unit 35 retrieves at least one frame from list 0 52A and at least one frame from list 1 52A. These frames of lists 0 and 1 52A and 52B may be referred to in this disclosure as a first reference frame and a second reference frame, respectively. Often, motion compensation unit 35 retrieves the first and second reference frames indicated by motion estimation unit 32.

As further shown in FIG. 3, motion compensation unit 35 includes a default prediction module 54, an offset calculation module 56, a comparator 58, an explicit prediction module 60, an implicit prediction module 62, and a rate distortion (R-D) analysis module 64 ("R-D analysis module 64"). Default prediction module 54 may represent a hardware and/or software module that implements the default weighted prediction algorithm described above with respect to equation (1). Offset calculation module 56 may represent a hardware and/or software module that calculates offset values, such as DC offset values, in the manner described above.

Comparator 58 may represent a hardware and/or software module that compares the offset values to a threshold value, which is shown in FIG. 3 as threshold 66. Explicit prediction module 60 may represent a hardware and/or software module that implements the explicit weighted prediction algorithm described above with respect to equation (2). Implicit prediction module 62 may represent a hardware and/or software module that implements the implicit weighted prediction algorithm described above with respect to equation (3). R-D analysis module 64 may represent a hardware and/or software module that implements the R-D analysis described above. R-D analysis module 64 may implement a cost function 68, such as that represented by equation (4), and employ cost function 68 to calculate costs 70A and 70B ("costs 70"). R-D analysis may base the analysis on these costs 70.

While shown in FIG. 3 as comprising various modules 54-64, these modules 54-64 are provided for demonstrative purposes. One or more of modules 54-64 may be implemented as an integrated module within motion compensation unit 35. Alternatively, motion compensation unit 35 may generally comprise a software or computer program executing on a processor. The various modules, in this case, may therefore represent software modules or components of the larger software program. The software program may comprise a plurality of instructions executable by the processor and which cause the processor to perform the techniques described in this disclosure.

In any event, after retrieving or otherwise receiving the first and second reference frames, motion compensation unit 35 may invoke or otherwise cause default prediction module 54 to generate predictive data representative of a first version of a predictive video block of a B-frame (or more generally, predictive frame), in accordance with the above equation (1). Default prediction module 54 may output this first version to offset calculation module 56, which may calculate the offset values in the manner described above. That is, offset calculation module 56 may calculate the offset values based on a comparison between the first version and the original video data or corresponding block within the first and second reference frames. In some instances, offset calculation module 56 may determine an absolute value of the offset values and output these offset values in this absolute value form. Offset calculation module 56 may forward these offset values to comparator 58, which may compare the offset values to threshold value 66. Threshold value 66 may be programmatically set, automatically set, or statically set. Typically, threshold value 66 is set to a value of zero (0).

Based on the comparison, comparator 58 may issue an activation code to both explicit prediction module 60 and implicit prediction module 62. The activation code may activate one or another, but not both, of explicit prediction module 60 and implicit prediction module 62. As described in the above example, when one or more of offset values exceed threshold value 66, comparator 58 may generate and transmit an activation code that activates explicit prediction module 60 but not implicit prediction module 62. When one or more of the offset values do not exceed threshold value 66, comparator 58 may generate and transmit an activation code that activates implicit prediction module 62 but not explicit prediction module 60.

Based on the activation code, either explicit or implicit prediction modules 60 or 62 generate a second version of the predictive video block of the predictive frame. The activated one of explicit or implicit prediction modules 60 or 62 may transmit this second version to R-D analysis module 64. While described with respect to an activation code, activation of explicit or implicit prediction modules 60 or 62 may occur in any number of ways. In some embodiments, both explicit and implicit prediction modules 60 and 62 may generate different versions of the predictive video block. In these embodiments, a multiplexor or other selection logic may select the second version from these different versions based on the activation code and transmit the selected version or second version to R-D analysis module 64.

Regardless of how the second version is obtained or determined, R-D analysis module 64 may also receive, at some point, the first version of the same predictive video block. R-D analysis module 64 may determine first and second distortion values 72A, 72B ("Dist. 72A" and "Dist. 72B") in the manner described above for the first and second versions. R-D analysis module 64 may also store or otherwise maintain lamda value 74 ("lamda 74") and bit rate value 76 ("rate 76"). R-D analysis module 64 may provide an appropriate one of distortion values 72A, 72B ("distortion values 72"), lamda value 74 and bit rate value 76 as inputs into cost function 68, which outputs a cost value 70A associated with the first version. R-D analysis module 64 may likewise provide an appropriate one of distortion values 72, lamda value 74 and bit rate value 76 as inputs into cost function 68, which outputs a cost value 70B associated with the second version.

R-D analysis module 76 may then compare costs 70 to one another to determine which of costs 70 is lower than the other. R-D analysis module 76 may then output either the first version or the second version of the predictive video block for which the lower one of costs 70 was calculated. R-D analysis module 76 may output this lower cost one of the first and second versions as predictive data representative of the predictive video block. In some instances, R-D analysis module 64 outputs as the predictive data the second version predicted by explicit prediction module 60 and the offset values calculated by offset calculation module 56, as described above.

As a result of only having to perform R-D analysis on two rather than three versions of the third coded unit, motion estimation unit 35 may more efficiently encode the predictive video block. This efficiency may refer to computational efficiency, which may also translate into more efficient power consumption.

Although described above with respect to a predictive video block, the techniques may apply to any other portion of a frame, e.g., a slice, as well as the entire frame. As noted above with respect to equations (1) through (3), the proj, proj0 and proj1 variable refer to a particular block of the respective reference frames. The techniques may be applied to a particular block selected from the frame as representative of all of the block of that frame and depending on the version selected, motion compensation unit 35 may apply the same predictive algorithm as that determined with respect to the selected reference block to encode the entire predictive frame. Alternatively, each individual block of the predictive frame may undergo the techniques described in this disclosure to efficiently select a prediction mode for each predictive block in a given predictive frame. In other aspect, the techniques may be applied at the slice level in either of the two ways described above. As a result, reference in this disclosure to performing a particular one of the prediction algorithms described above to a predictive video block should not be considered limiting. Rather, reference to a predictive video block may generally encompass any of the forgoing examples as well as examples not explicitly described in this disclosure but readily understood or extrapolated from this disclosure.

Figure 4:
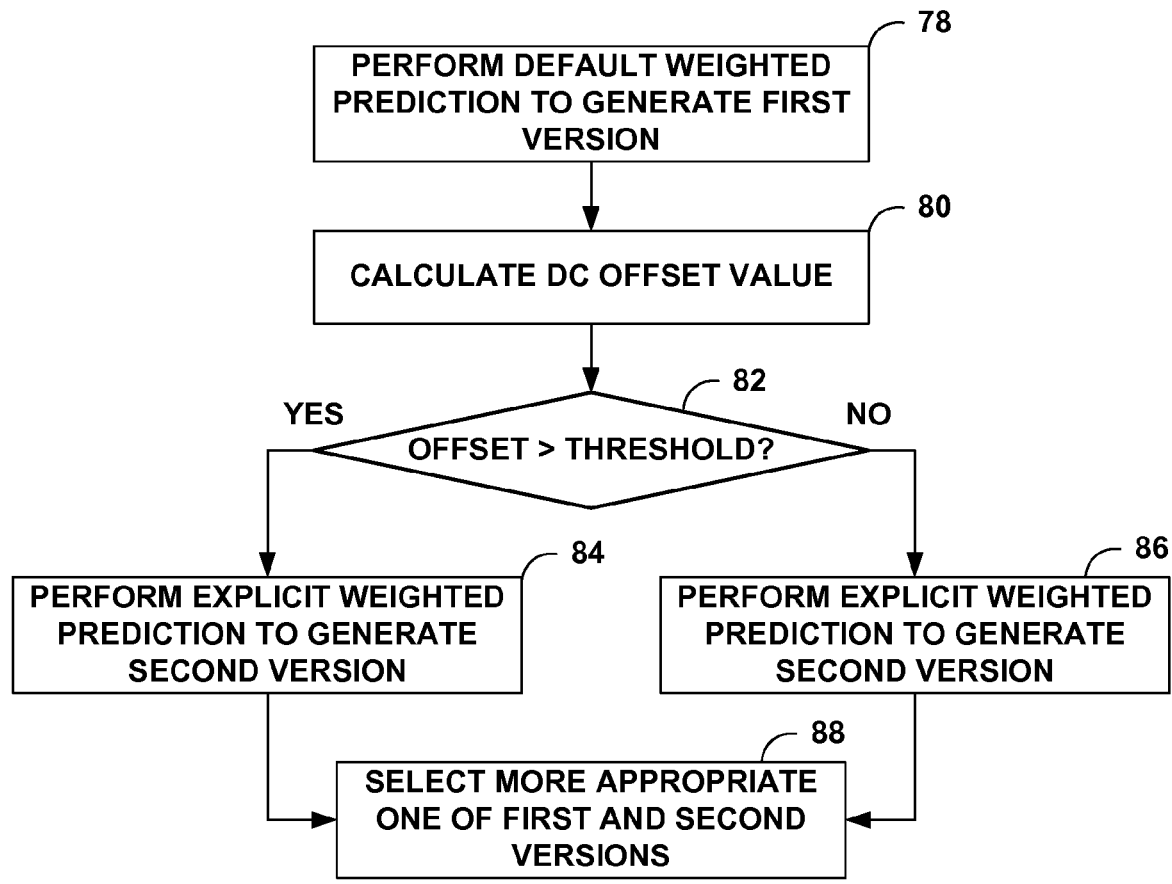
FIG. 4 is a flow chart illustrating example operation of a video encoder in performing the techniques described in this disclosure.

FIG. 4 is a flow chart illustrating example operation of a video encoder in performing the techniques described in this disclosure. While described with respect to a particular video encoder 50 of FIG. 2 and more particularly a particular component of video encoder 50, e.g., motion compensation unit 35 of FIG. 3, the techniques may be implemented in hardware and/or software by any of the devices mentioned above with respect to FIG. 1.

Initially, motion compensation unit 35 and, more particularly, default prediction module 54 performs, e.g., in accordance with the above equation (1), default weighted prediction to generate a first version of a predictive video block of a B-frame from a first and second reference video blocks of respective first and second reference frames (78). As described above, motion compensation unit 35 may retrieve either the first and second reference frames in their entirety or only the first and second reference video blocks from reference frame store 34. Default prediction module 54 may then pass the first version to offset calculation module 56, which may calculate one or more offset values, e.g., an average DC offset value in absolute value form (80). Offset calculation module 56 may then forward these one or more DC offset values to comparator 58.

Comparator 58 may compare these one or more DC offset values to threshold value 66 (82). Based on the comparison, comparator 58 may issue an activation signal to activate either but not both of explicit prediction module 60 or implicit prediction module 62. In the example operation shown in FIG. 4, comparator 58 may activate by way of the activation signal explicit prediction module 60 upon determining that the DC offset values exceed threshold value 66 ("YES" 82). However, upon determining that the DC offset does not exceed threshold value 66 ("NO" 82), comparator 58 may activate by way of the activation signal implicit prediction module 62.

In instances where the DC offset values exceed threshold value 66 and comparator 58 issues an activation signal to activate explicit prediction module 60, explicit prediction module 60 performs explicit weighted prediction, e.g., in accordance with the above equation (2), to generate a second version of the prediction video block from the first and second reference video blocks, as described above (84). In instances where the DC offset values do not exceed threshold value 66 and comparator 58 issues an activation signal to activate implicit prediction module 62, implicit prediction module 62 performs implicit weighted prediction, e.g., in accordance with the above equation (3), to generate the second version of the prediction video block from the first and second reference video blocks, as described above (86). Regardless of which of explicit or implicit prediction modules 60, 62 generate the second version, the respectively activated one of modules 60, 62 pass the second version to R-D analysis module 64.

R-D analysis module 64 also receives, as described above, the first version of the predictive video block and selects a more appropriate one of the first and second versions (88). That is, R-D analysis module 64 may perform the above described R-D analysis, e.g., in accordance with the above equation (4), to generate costs 70A and 70B for each one of the first and second versions, respectively and select the one of the first and second versions associated with the lowest one of costs 70A, 70B. This selected version "more appropriately" represents, for a given bit rate, the original video data to which the prediction video data corresponds. Motion compensation unit 35 may then output this selected version, which video encoder 22 may proceed to encode as the predictive video block of the predictive B-frame.

In one aspect, motion compensation unit 35 may, when the absolute value of the calculated DC offset value exceeds the threshold value, perform R-D analysis according to equation (4) above to select between a first version of the predictive video block generated by way of default weighted prediction and a second version of the same predictive video block generated by way of explicit weighted prediction using the default weights. Motion compensation unit 35 may, in other words, select between explicitly encoding the default weight or not explicitly encoding the default weights. This selection occurs, as suggested above, because when performing explicit weighted prediction, motion estimation unit 35 may also encode the calculated DC offset values.

However, when the absolute value of the calculated DC offset does not exceed the threshold value, motion compensation unit 35 may perform R-D analysis according to equation (4) above to select between the first version of the predictive video block generated by way of default weighted prediction and a second version of the same predictive video block generated by way of implicit weighted prediction using the implicitly determined weights. In this respect, motion compensation unit 35 may determine that DC offsets are not necessary to encode and therefore select between either the first and second versions. As a result of comparing this calculated DC offset to the threshold, motion compensation unit 35 may, in other words, select between performing either implicit and explicit weighted prediction, perform the selected one of either implicit and explicit weighted prediction without performing the unselected one of either the implicit and explicit weighted prediction to generate the second version and encode the predictive video block as either the first or second version.

Figure 5:
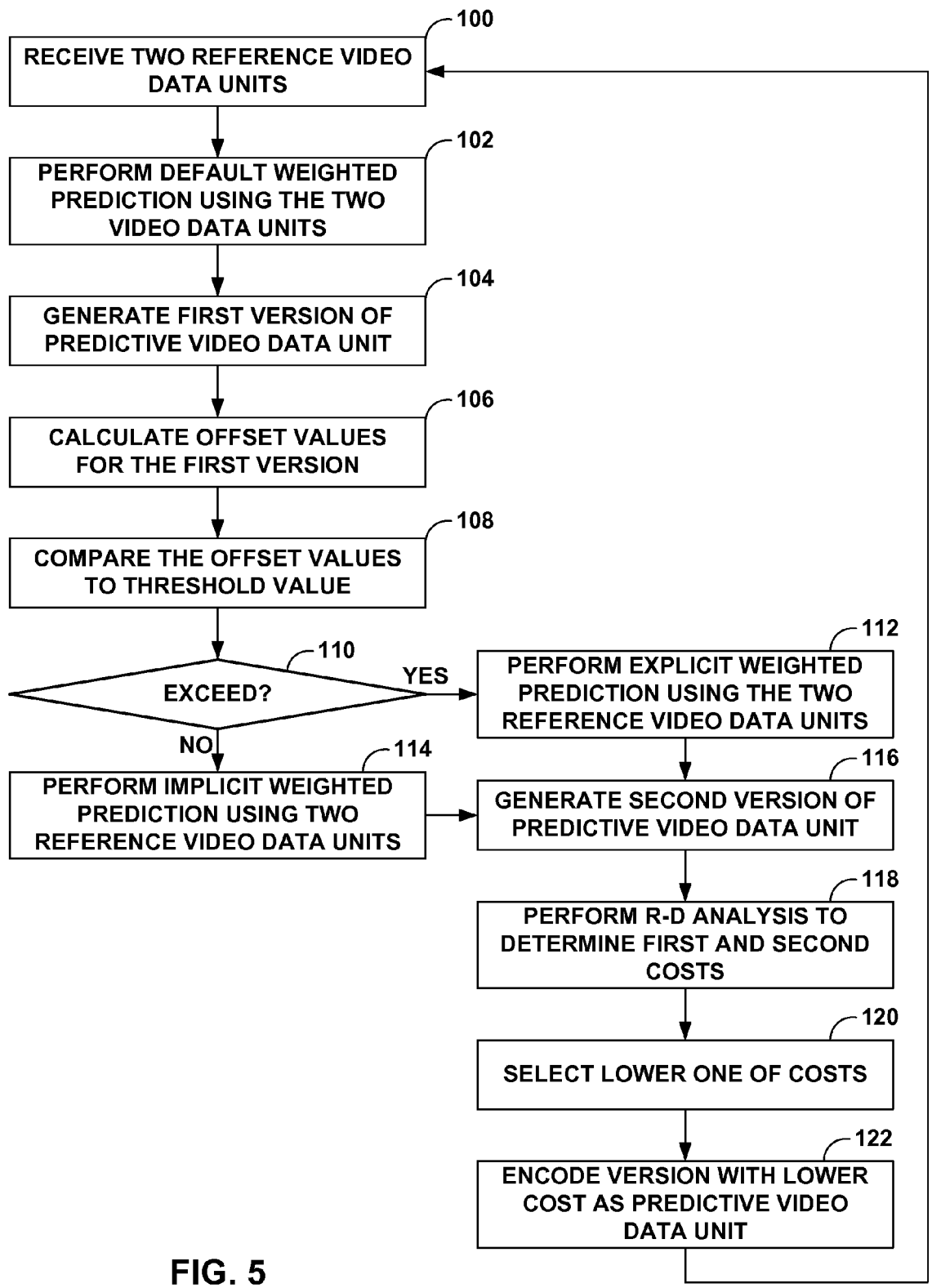
FIG. 5 is a flow chart illustrating an example operation of a video encoder in performing the techniques described in this disclosure in more detail.

FIG. 5 is a flow chart illustrating an example operation of a video encoder in performing the techniques described in this disclosure in more detail. Again, while described with respect to a particular video encoder 50 of FIG. 2 and more particularly a particular component of video encoder 50, e.g., motion compensation unit 35 of FIG. 3, the techniques may be implemented in hardware and/or software by any of the devices mentioned above with respect to FIG. 1.

Initially, motion compensation unit 35 receives two reference video data units, e.g., reference video blocks, from reference frame store 34, as described above (100). Alternatively, motion compensation unit 35 may receive two reference coded units, e.g., reference frames, that each include one of the two reference video data units. Default prediction module 54 may perform the default weighted prediction using the reference video blocks in the manner described above, for example, with respect to equation (1) to generate a first version of the predictive video data unit, e.g., a predictive video block, from the two, e.g., first and second, reference video blocks (102, 104). After generating the first version, default prediction module 54 may output the first version to offset calculation module 56.

Offset calculation module 56, again in the manner described above, may calculate offset values, such as the above described DC offset values, for the first version of the predictive video block (106). Offset calculation module 56 may then output the offset values to comparator 58, which proceeds to compare the offset values to threshold value 66 (108). If one or more, an average, possibly all, or any other metric derived from the calculated offset values exceed threshold value 66 ("YES" 110), comparator 58 may generate and output an activation code that activates explicit prediction module 60 rather than implicit prediction module 62. If one or more, an average, a mean, possibly all, or any metric derived from the calculated offset values do not exceed threshold value 66 ("NO" 110), comparator 58 may generate and output an activation code that activates implicit prediction module 62 rather than explicit prediction module 60.

If explicit prediction module 60 is activated, explicit prediction module 60 performs explicit weighted prediction in the manner described above with respect to, for example, equation (2) using the two reference video blocks to predict or generate a second version of the predictive video data unit, e.g., the predictive video block, from the two reference video blocks (112, 116). However, if implicit prediction module 62 is activated, implicit prediction module 52 performs implicit weighted prediction in the manner described above with respect to, for example, equation (3) using the reference video blocks to predict or generate the second version of the predictive video block from the reference video blocks (114, 116). Regardless of which module generates the second version of the predictive video block, either explicit prediction module 60 or implicit prediction module 62 outputs the second version to R-D analysis module 64.

R-D analysis module 64 may also receive the first version of the predictive video block and may perform an R-D analysis in the manner described above with respect to, for example, equation (4) to determine first and second costs 72 (118). R-D analysis module 64 may then select a lower one of costs 72 (120). R-D analysis module 64 may in selecting the lower one of costs 72 select whichever of the first or second versions are associated with the lower one of costs 72 and encode this version associated with the lower one of costs 72 as the third coded unit (122).

Figure 6:
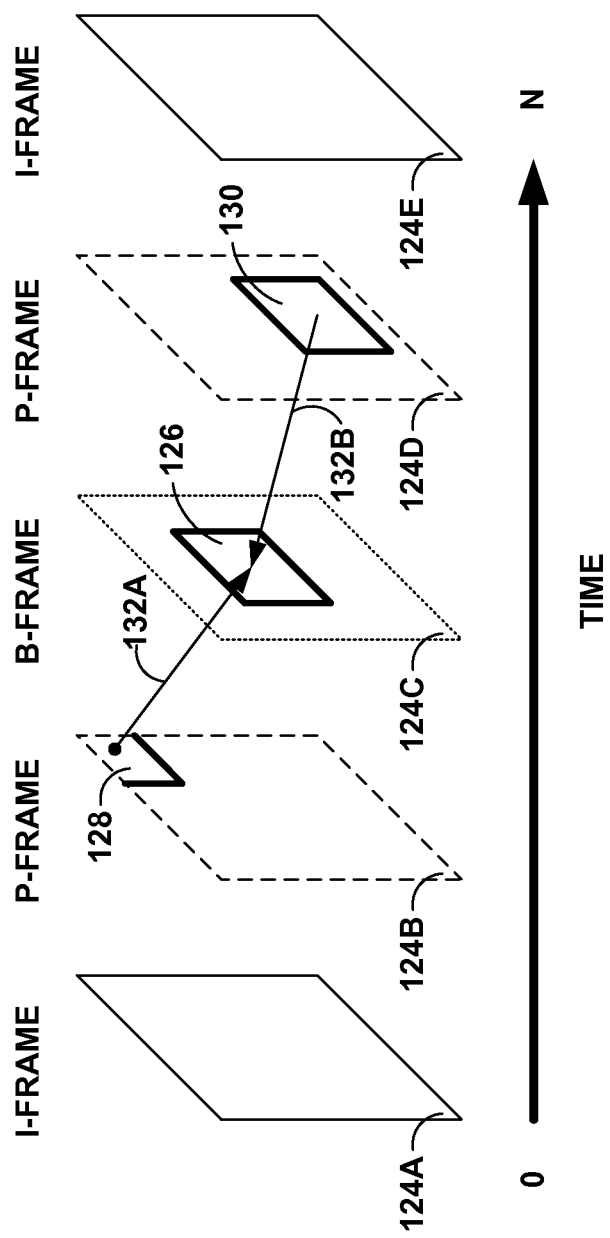
FIG. 6 is a diagram illustrating an example temporally-ordered sequence of coded units.

FIG. 6 is a diagram illustrating an example temporally-ordered sequence of coded units 124A-124E. That is, coded unit 124A occurs in time before coded unit 124B, which occur in time before coded unit 124C, which occurs in time before coded unit 124D, which in turn occurs in time before coded unit 124E. While coded units 124A-124E ("coded units 124") occur in time before each other one or more of coded units 124 may be encoded before another one of coded units 124. For example, coded units 124A and 124E each represent I-frames that are independently coded, hence the "I" in I-frame, from every other one of coded units 124, while coded units 124B and 124D each represent P-frames that are predictively encoded, hence the "P" in P-frame, from at least one other of coded units 124. Thus, even though I-frame 124E occurs after P-frame 124D, I-frame 124E may be coded in time before P-frame 124D as the encoding of I-frame 124E may not depend on another frame, which may or may not yet be encoded.

In any event, coded unit 124C may represent a B-frame which is encoded according to one of the three motion compensated bi-directional prediction algorithms described above, hence the "B" in B-frame. As shown in FIG. 3, a video data unit 126 of B-frame 124C may be predicted from both a portion or video data unit of a previous frame in time, e.g., a video data unit 128 of P-frame 124B, and a portion or video data unit of a subsequent or future frame in time, e.g., a video data unit 130 of P-frame 124D. While described as predicted bi-directionally from a first previous frame 124B in time and a second subsequent frame 124D in time, video data unit 104 may be bi-directionally predicted from two subsequent coded units 124 or two previous coded units 124. Video data units 126, 128 and 130 may each represent a corresponding video block, such as a macroblock or any other video block of any size. A corresponding video block may comprise a pair of video blocks that are similar to one another in that each block defines pixel data whose, as one example, mean values are within set or adaptive tolerances. Moreover, while shown as bi-directionally predicted from two directly adjacent frames 124B and 124D, video data unit 126 may be bi-directionally predicted from frames not adjacent to B-frame 124C, such as coded unit 124A and coded unit 124E. In this respect, the techniques should not be limited to the example provided in this disclosure.

Motion estimation unit 32 may locate these portions or video data units 128 and 130 that correspond to video data unit 126 and, for the sake of illustrative purposes, determine motion vectors 132A and 132B ("motion vectors 132"). Motion compensation unit 35 may receive these video data units 128 and 130 either by accessing reference frame store 34 and retrieving P-frames 124B and 124D ("P-frames 124") or directly from motion estimation unit 32. Notably, one of P-frames 124 may comprise a frame from the set of frames referred to as list 0 52A, while the other one of P-frames 124 may comprise a frame from the set of frames referred to as list 1 52B.

Motion compensation unit 35 may then implement the techniques described in this disclosure to efficiently select one of two versions of video data unit 126 generated by performing only two of the possible three motion-compensated bi-directional prediction algorithms using portions 128 and 130. In this example, the techniques are applied to predict a portion or video data unit, such as a macroblock or a video block of any other size, of a coded unit or B-frame 124C. Whether applied to a portion, such as video data unit 126, or an entire coded unit, such as coded unit 124C, the techniques may efficiently select between two rather than three versions.

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various embodiments of the invention have been described. These and other embodiments are within the scope of the following claims.

The invention claimed is:

1. A method of encoding video data, the method comprising:
receiving first and second reference coded units of the video data, wherein each of the first and second coded units each comprise respective first and second reference video data units;
performing default weighted prediction to predict a first version of a predictive video data unit of a predictive coded unit of the video data from the first and second reference video data units, wherein each of the two reference coded units occur either temporally before or after the predictive coded unit;
calculating an offset value for the first version of the predictive video data unit as a function of at least one of the first and second reference video data units and the predictive video data unit;
comparing the calculated offset value to a threshold value;
selecting, based on the comparison of the calculated offset value to the threshold value, either an implicit or explicit weighted prediction mode;
performing the selected mode to predict a second version of the predictive video data unit from the first and second reference video data units; and
encoding the predictive video data unit only as either the first version or the second version.

2. The method of claim 1,
wherein comparing the calculated offset value to the threshold value comprises calculating an absolute value of the offset value and comparing the absolute value of the offset value to the threshold value, and
wherein selecting either an implicit or explicit weighted prediction mode comprises selecting either the implicit or explicit weighted prediction mode based on the comparison to predict the second version of the predictive video data unit from the reference video data units.

3. The method of claim 2, wherein performing either the selected mode comprises:
when the absolute value of the offset value exceeds the threshold value, performing explicit weighted prediction to predict the second version of the predictive video data unit from the reference video data units; and when the absolute value of the offset value does not exceed the threshold value, performing implicit weighted prediction to predict the second version of the predictive video data unit from the reference video data units.

4. The method of claim 1, further comprising determining whether the first or the second version of the predictive video data unit more appropriately encodes the video data,
wherein encoding the predictive video data unit only as either the first version or the second version comprises encoding the predictive video data unit only as either the first version or the second version based on the determination.

5. The method of claim 4, wherein determining whether the first or the second version of the predictive video data unit more appropriately encodes the video data comprises:
comparing each of the first and second versions of the predictive video data unit to a corresponding portion of the video data to determine first and second distortion values, wherein the first and second distortion values each respectively indicate an amount of distortion introduced by the first and second versions;
calculating first and second costs for the first and second versions of the predictive video data unit based on the respective first and second distortion values;
comparing the first and second costs to determine which of the costs is lower; and
selecting either the first or the second version based on the comparison.

6. The method of claim 5, wherein calculating the first and the second cost costs comprises calculating each of the first and second costs in accordance with the following cost function:

$$Fc = d + (\lambda o * R),$$

wherein Fc comprises a variable representative of the cost function, d comprises a variable representative of either the first or the second distortion value, $\lambda o$ comprises a variable representative of a Lagrangian, and R comprises a variable representative of a bit rate at which the video data is encoded.

7. The method of claim 1,
wherein the first reference coded unit occurs in time before the predictive coded unit,
wherein the second reference coded unit occurs in time after the predictive coded unit,
wherein the predictive coded unit comprises a bi-directional predicted frame (B-frame), and
wherein the first and second coded units each comprises one of a independently coded frame (I-frame), a predicted frame (P-frame), or another B-frame.

8. The method of claim 1,
wherein receiving the first and second reference coded units comprises receiving a first reference frame that includes a first reference video block and a second reference frame that includes a second reference video block,
wherein performing the default weighted prediction comprises performing the default weighted prediction to predict a first version of a predictive video block of a predictive frame from the first and second reference video blocks, wherein the first and second reference frames occur in time either before or after the predictive video frame,
wherein calculating the offset value comprises calculating the offset value for the first version of the predictive video block of the predictive frame,
wherein performing the select mode comprises performing the selected mode to predict a second version of the predictive video block of the predictive frame from the first and second reference video blocks, and
wherein encoding the predictive video data unit comprises encoding the predictive video block of the predictive frame only as either the first version or the second version.

9. The method of claim 1, wherein encoding the predictive video data unit comprises, when the second version of the predictive video data unit comprises the second version predicted using the explicit weighted prediction, encoding the predictive video data unit as the second version of the predictive video data unit and the offset value in addition to the second version.

10. The method of claim 1, wherein the method is performed by a video encoder or a video encoder/decoder (CODEC).

11. An apparatus that encodes video data, the apparatus comprising a video encoder that includes:
a memory that stores a first and second reference coded units, wherein the first reference coded unit includes a first reference video data unit and the second reference coded unit includes a second reference video data unit; and
a motion compensation unit that performs default weighted prediction to predict a first version of a predictive video data unit of a predictive coded unit of the video data from the first and second reference video data units, wherein each of the two reference coded units occur either temporally before or after the predictive coded unit, calculates an offset value for the first version of the predictive video data unit as a function of at least one of the first and second reference video data units and the predictive video data unit, compares the calculated offset value to a threshold value, selects, based on the comparison of the calculated offset value to the threshold value, either an implicit or explicit weighted prediction mode, performs the selected mode to predict a second version of the predictive video data unit from the first and second reference video data units and encodes the predictive video data unit only as either the first version or the second version.

12. The apparatus of claim 11, wherein the motion compensation unit comprises:
an offset calculation module that calculates an absolute value of the offset value; and
a comparator that compares the absolute value of the offset value to the threshold value,
wherein the motion compensation unit selects either the implicit or explicit weighted prediction modes based on the comparison of the absolute value of the offset value to the threshold value.

13. The apparatus of claim 12, wherein the motion compensation unit comprises:
an explicit prediction module that, when the absolute value of the offset value exceeds the threshold value, performs explicit weighted prediction to predict the second version of the predictive video data unit from the reference video data units; and
an implicit prediction module that, when the absolute value of the offset value does not exceed the threshold value, performs implicit weighted prediction to predict the second version of the predictive video data unit from the reference video data units.

14. The apparatus of claim 11,
wherein the motion compensation unit includes an analysis module that determines whether the first or the second version of the predictive video data unit more appropriately encodes the video data, and wherein the motion compensation unit encodes the predictive video data unit only as either the first version or the second version based on the determination.

15. The apparatus of claim 14, wherein the analysis module comprises a rate-distortion (R-D) analysis module that compares each of the first and second versions of the predictive video data unit to a corresponding portion of the video data to determine first and second distortion values, wherein the first and second distortion values each respectively indicate an amount of distortion introduced by the first and second versions, calculates first and second cost for the first and second versions of the predictive video data unit based on the respective first and second distortion values, compares the first and second costs to determine which of the costs is lower, and selects either the first or the second version based on the comparison.

16. The apparatus of claim 15, wherein the R-D analysis module calculates each of the first and second costs in accordance with the following cost function:

$$Fc = d + (\lambda o * R),$$

wherein Fc comprises a variable representative of the cost function, d comprises a variable representative of either the first or the second distortion value, λo comprises a variable representative of a Lagrangian, and R comprises a variable representative of a bit rate at which the video data is encoded.

17. The apparatus of claim 11,
wherein a first reference coded unit occurs in time before the predictive coded unit,
wherein a second reference coded unit occurs in time after the predictive coded unit,
wherein the predictive coded unit comprises a bi-directional predicted frame (B-frame), and
wherein the first and second coded units each comprises one of a independently coded frame (I-frame), a predicted frame (P-frame), or another B-frame.

18. The apparatus of claim 11,
wherein the first and second coded units comprise first and second reference frames respectively,
wherein the first and second reference video data units comprise a first reference video block from the first reference frame and a second reference video block from the second reference frame respectively,
wherein the motion compensation unit includes:
a default prediction module that performs the default weighted prediction to predict a first version of a predictive video block of a predictive frame from the first and second reference video blocks, wherein the first and second reference frames occur in time either before or after the predictive video frame;
an offset calculation module that calculates the offset value for the first version of the predictive video block of the predictive frame;
an implicit prediction module that implements the implicit weighted prediction; and
an explicit prediction module that implements the explicit weighted prediction, wherein,
based on the comparison of the calculated offset value to the threshold value, either the implicit or explicit prediction module performs either the implicit or explicit weighted prediction to predict a second version of the predictive video block of the predictive frame from the first and second reference video blocks, and wherein the motion compensation unit encodes the predictive video block of the predictive frame only as either the first version or the second version.

19. The apparatus of claim 11, wherein the motion compensation unit further, when the second version of the predictive video data unit comprises the second version predicted using the explicit weighted prediction, encodes the predictive video data unit as the second version of the predictive video data unit and the offset value in addition to the second version.

20. The apparatus of claim 11, wherein apparatus comprises video encoder hardware or video encoder/decoder (CODEC) hardware.

21. A device that encodes video data, the device comprising:
means for encoding video data, wherein the means for encoding video data includes:
means for storing a first and second reference coded units of the video data, wherein the first reference coded unit includes a first reference video data unit and the second reference coded unit includes a second reference video data unit;
means for performing default weighted prediction to predict a first version of a predictive video data unit of a predictive coded unit of the video data from the first and second reference video data units, wherein each of the two reference coded units occur either temporally before or after the predictive coded unit;
means for calculating an offset value for the first version of the predictive video data unit as a function of at least one of the first and second reference video data units and the predictive video data unit;
means for comparing the calculated offset value to a threshold value;
means for performing, based on the comparison of the calculated offset value to the threshold value, either, but not both, implicit weighted prediction or explicit weighted prediction to predict a second version of the predictive video data unit from the first and second reference video data units; and
means for encoding the predictive video data unit only as either the first version or the second version.

22. The device of claim 21,
wherein the means for calculating further comprises means for calculating an absolute value of the offset value; and
wherein the means for comparing comprises means for comparing the absolute value of the offset value to the threshold value,
wherein the means for performing either the implicit or explicit weighted prediction performs either the implicit or explicit weighted prediction based on the comparison of the absolute value of the offset value to the threshold value to predict the second version of the predictive video data unit from the reference video data units.

23. The device of claim 22, wherein the means for performing either the implicit or explicit weighted prediction comprises:
means for performing, when the absolute value of the offset value exceeds the threshold value, the explicit weighted prediction to predict the second version of the predictive video data unit from the reference video data units; and
means for performing, when the absolute value of the offset value does not exceed the threshold value, the implicit weighted prediction to predict the second version of the predictive video data unit from the reference video data units.

24. The device of claim 21, further comprising
means for determining whether the first or the second version of the predictive video data unit more appropriately encodes the video data,
wherein the means for encoding the predictive video data unit only as either the first version or the second version encodes the predictive video data unit only as either the first version or the second version based on the determination.

25. The device of claim 24, wherein the means for determining whether the first or the second version of the predictive video data unit more appropriately encodes the video data comprises:
means for comparing each of the first and second versions of the predictive video data unit to a corresponding portion of the video data to determine first and second distortion values, wherein the first and second distortion values each respectively indicate an amount of distortion introduced by the first and second versions;
means for calculating first and second costs for the first and second versions of the predictive video data unit based on the respective first and second distortion values;
means for comparing the first and second costs to determine which of the costs is lower; and
means for selecting either the first or the second version based on the comparison.

26. The device of claim 25, wherein the means for calculating the first and second costs calculates each of the first and second costs in accordance with the following cost function:

$$Fc=d+(\lambda o*R),$$

wherein Fc comprises a variable representative of the cost function, d comprises a variable representative of either the first or the second distortion value, $\lambda o$ comprises a variable representative of a Lagrangian, and R comprises a variable representative of a bit rate at which the video data is encoded.

27. The device of claim 21,
wherein the first reference coded unit occurs in time before the predictive coded unit,
wherein the second reference coded unit occurs in time after the predictive coded unit,
wherein the predictive coded unit comprises a bi-directional predicted frame (B-frame), and
wherein the first and second coded units each comprises one of a independently coded frame (I-frame), a predicted frame (P-frame), or another B-frame.

28. The device of claim 21,
wherein the means for storing the first and second different reference coded units stores a first reference frame that includes a first reference video block and a second reference frame that includes a second reference video block,
wherein the means for performing the default weighted prediction performs the default weighted prediction to predict a first version of a predictive video block of a predictive frame from the first and second reference video blocks, wherein the first and second reference frames occur in time either before or after the predictive video frame,
wherein the means for calculating the offset value calculates the offset value for the first version of the predictive video block of the predictive frame,
wherein the means for performing, based on the comparison of the calculated offset value to the threshold value, either the implicit or explicit weighted prediction performs, based on the comparison of the calculated offset value to the threshold value, either the implicit or explicit weighted prediction to predict a second version of the predictive video block of the predictive frame from the first and second reference video blocks, and
wherein the means for encoding the predictive video data unit encodes the predictive video block of the predictive frame only as either the first version or the second version.

29. The device of claim 21, wherein the means for encoding the predictive video data unit encodes, when the second version of the predictive video data unit comprises the second version predicted using the explicit weighted prediction, the predictive video data unit as the second version of the predictive video data unit and the offset value in addition to the second version.

30. The device of claim 21, wherein the device comprises video encoder hardware or video encoder/decoder (CODEC) hardware.

31. A non-transitory computer-readable medium comprising instructions for causing a programmable processor to:
receive first and second reference coded units of the video data, wherein each of the first and second coded units each comprise respective first and second reference video data units;
perform default weighted prediction to predict a first version of a predictive video data unit of a predictive coded unit of the video data from the first and second reference video data units, wherein each of the two reference coded units occur either temporally before or after the predictive coded unit;
calculate an offset value for the first version of the predictive video data unit as a function of at least one of the first and second reference video data units and the predictive video data unit;
compare the calculated offset value to a threshold value;
select, based on the comparison of the calculated offset value to the threshold value, either an implicit weighted prediction mode or an explicit weighted prediction mode;
perform the selected mode to predict a second version of the predictive video data unit from the first and second reference video data units; and
encode the predictive video data unit only as either the first version or the second version.

32. The non-transitory computer-readable medium of claim 31, wherein the instructions further cause the programmable processor to:
calculate an absolute value of the offset value;
compare the absolute value of the offset value to the threshold value; and
select either the implicit or explicit weighted prediction mode based on the comparison of the absolute value of the offset value to the threshold value.

33. The non-transitory computer-readable medium of claim 32, wherein the instruction cause the programmable processor to:
when the absolute value of the offset value exceeds the threshold value, perform the explicit weighted prediction to predict the second version of the predictive video data unit from the reference video data units; and
when the absolute value of the offset value does not exceed the threshold value, perform the implicit weighted prediction to predict the second version of the predictive video data unit from the reference video data units.

34. The non-transitory computer-readable medium of claim 31, wherein the instructions cause the programmable processor to determine whether the first or the second version of the predictive video data unit more appropriately encodes the video data, wherein the instructions cause the programmable processor to encode the predictive video data unit only as either the first version or the second version based on the determination.

35. The non-transitory computer-readable medium of claim 34, wherein the instructions cause the programmable processor to:

compare each of the first and second versions of the predictive video data unit to a corresponding portion of the video data to determine first and second distortion values, wherein the first and second distortion values each respectively indicate an amount of distortion introduced by the first and second versions;

calculate first and second costs for the first and second versions of the predictive video data unit based on the respective first and second distortion values;

compare the first and second costs to determine which of the costs is lower; and select either the first or the second version based on the comparison.

36. The non-transitory computer-readable medium of claim 35, wherein the instructions cause the programmable processor to calculate each of the first and second costs in accordance with the following cost function:

$$Fc=d+(\lambda o*R),$$

wherein Fc comprises a variable representative of the cost function, d comprises a variable representative of either the first or the second distortion value, λo comprises a variable representative of a Lagrangian, and R comprises a variable representative of a bit rate at which the video data is encoded.

37. The non-transitory computer-readable medium of claim 31, wherein the first reference coded unit occurs in time before the predictive coded unit, wherein the second reference coded unit occurs in time after the predictive coded unit, wherein the predictive coded unit comprises a bi-directional predicted frame (B-frame), and wherein the first and second coded units each comprises one of a independently coded frame (I-frame), a predicted frame (P-frame), or another B-frame.

38. The non-transitory computer-readable medium of claim 31, wherein the instructions cause the programmable processor to:

receive a first reference frame that includes a first reference video block and a second reference frame that includes a second reference video block;

perform the default weighted prediction to predict a first version of a predictive video block of a predictive frame from the first and second reference video blocks, wherein the first and second reference frames occur in time either before or after the predictive video frame;

calculate the offset value for the first version of the predictive video block of the predictive frame;

select, based on the comparison of the calculated offset value to the threshold value, either an implicit or explicit weighted prediction mode;

perform the selected mode to predict a second version of the predictive video block of the predictive frame from the first and second reference video blocks; and encode the predictive video block of the predictive frame only as either the first version or the second version.

39. The non-transitory computer-readable medium of claim 31, wherein the instructions cause the instructions cause the programmable processor to, when the second version of the predictive video data unit comprises the second version predicted using the explicit weighted prediction, encode the predictive video data unit as the second version of the predictive video data unit and the offset value in addition to the second version.

* * * * *